(No Model.)

C. STAHLBERG.
MANUFACTURE OF CLOCK WORKS.

No. 326,602. Patented Sept. 22, 1885.

WITNESSES:
Archibald Bannatyne
William Paton

INVENTOR:
Chas. Stahlberg

UNITED STATES PATENT OFFICE.

CHARLES STAHLBERG, OF WATERBURY, CONNECTICUT.

MANUFACTURE OF CLOCK-WORKS.

SPECIFICATION forming part of Letters Patent No. 326,602, dated September 22, 1885.

Application filed June 1, 1885. (No model.)

*To all whom it may concern:*

Be it known that I, CHARLES STAHLBERG, a citizen of the United States, residing at Waterbury, in the county of New Haven and State of Connecticut, have invented certain new and useful Improvements in the Manufacture of Time-Pieces and Clock-Work Mechanisms, of which the following is a specification, reference being had to the accompanying drawings.

My invention relates to clocks and kindred mechanisms where resistance to wear and accuracy of construction are required; and it consists in making the parts of the same—such as wheel-shafts, pinions, socket-wheels, balances, verges, and plates—by casting their body portions of an alloy which expands on solidifying around or into extensions or recesses of hard metal acting portions, whereby such portions—
as pivots, pinions, pallets, bearings, wheels, &c.—of brass, steel, or other hard metal, are clamped and held in position by the above-mentioned alloy, which latter forms the remaining portions of the finished part.

The objects of this invention are, first, to make small and neat time-pieces which shall be cheap and of good quality in all essential features; second, to do away with a large portion of expensive machinery and skilled labor which is now necessary in manufacturing cheap clocks; third, to enable new designs of movements to be brought into market quickly and at a small outlay.

Heretofore such clock parts have been made entirely of hard metal, brought to shape by turning, drilling, milling, &c., requiring highly-skilled labor. Wire was cut in lengths for wheel-shafts, collets driven or soldered on, and then turned. The ends of the shafts were turned down to form pivots, and the wheel afterward stalked onto the collet. The pinion-collets were drilled and filled with pinion-wires, and the latter fastened by upsetting the holes of the collet; or they were driven and held by friction. In other cases, lengths of wire of the same diameter as the outside of the pinion were cut off, and these turned down to form the shafts and pivots. The pinion-leaves were formed by milling and were afterward polished with laps. These are all expensive operations, and it is difficult to obtain pinions of uniform excellence. In other cases the pivots are turned on the shaft, holes drilled in a wheel or a collet for the pinion-wires, and then the shaft, collet, pinion-wires, and wheel were soldered together with soft-solder. In this process an acid flux is necessary, which causes the parts to rust, and it is also necessary to heat the parts as hot as the melted solder, so that the latter may adhere, which draws the temper and discolors the parts.

The objections in all of these cases are various and many, a few of which I will enumerate. The pivots come soft, or they could not be turned. If hardened afterward the parts are either entirely spoiled or sprung out of true, and require repolishing. The pivots come large, and not always round and of the same size, which requires extra freedom in the bearings to insure against binding. In most of these cases the wheel requires truing up after being stalked, and it is also necessary to have the holes in the wheel and the holes for the pinion wires perfectly true, so that when put together the finished wheel will come true with the rim.

By my method the acting portions—such as the wheel-teeth, pivots, and pinion-wires—and portions requiring lightness combined with strength—such as the wheel-rim and spokes—are all made of hard metal. These portions are placed in their respective places in a "jig-mold" provided for them, so as to partially project into the cavity of the mold, and the latter is then filled with an alloy which expands on solidifying, whereby the remaining portions of the wheel—such as the shaft-body, collets, and hubs—are formed and the acting portions are clamped and held in place by virtue of the expansive quality of the alloy. Thus the result is virtually the same and of the same character as though the holes and shoulders had previously been made and the pinion-wires, pivots, and wheel had then been fastened therein by driving and stalking. In this method the acting parts do not become hot enough to draw the temper, as would be the case in a soldering operation. It will be observed that the acting portions are not soldered in, but they are held by friction. To prevent these portions from being drawn out, they are slightly nicked, to anchor them in the alloy.

By the use of this method the objections before enumerated are avoided. The operation requires but ordinary intelligence, and absolute truth and unformity of the wheels are obtained. Before casting the wires for the pivots and pinions can be readily and cheaply polished and tempered by well-known means. The pivots may be much smaller than used in other processes, and they will come round, straight, strong, and of uniform thickness, thus enabling the bearings to be made longer and of a better fit, which adds greatly to the wearing qualities, besides enabling the use of soft-metal bearings. The pinion-leaves may also be made of drawn flat wire with accurate curves, set in collets by their ends, or they may be set into the shaft-body by their sides, thus resembling a cut pinion.

Heretofore clock-verges have been made by forming the pallets and pallet-arms of one piece of steel and then driving the same onto a turned-up shaft. In this way verges did not come uniform, and required subsequent adjusting by bending and other means. By my method the verge shaft and pallet arms are cast in one piece on the pivots and pallets previously prepared, similarly to casting other shafts. This gives verges with very hard and highly-polished pallets and of uniform shape, not requiring subsequent adjustment.

Balance-wheels have heretofore been made by cutting off sections of tubing for the rim, which were turned to weight, drilling same for spokes, which latter were driven through the rim into a collet, and then the collet driven onto the shaft. The shaft was turned, hardened, and ground, generally with conical pivots. The impulse-roller was driven into the collet. All of which resulted in balance-wheels greatly out of true, which required subsequent poising. Other methods are used similarly inaccurate. For very fine balances much care and highly-skilled labor were employed, which prevented their use in cheap clocks. By my method the rim, shaft, and collet are cast on the spokes, impulse-pin, and roller-table or other portions requiring hard metal, and the result is a cheap balance-wheel superior in all essential qualities. By this method also small hard and highly-polished cylindrical pivots are obtained, which is of great advantage. Movement-plates can also be made by this method with pillars and studs attached by casting. The bearings consist of brass bushings, about which the body of the plate is cast. These plates have heretofore been made by punching them out of sheet metal, punching or drilling the holes, and fastening the pillars and studs by riveting.

Socket-wheels by my method are made by casting the sleeve and collet on the hard-metal wheel. The alloy is sufficiently strong for use in this way. Heretofore the sleeve and collet have been formed of solid brass and the wheel afterward stalked on.

In the drawings, molds used in this process and finished parts are represented. Figures 1 and 2 are face views of the two halves of a jig-mold for casting wheel-shafts. Fig. 3 is a side elevation, and Fig. 4 a longitudinal section, of the same mold. Fig. 5 shows a hard metal wheel as used. Fig. 6 is a side view of a finished wheel. Fig. 7 is a side view of a finished shaft with pinion attached. Figs. 8 and 9 are respectively side and plan views of a pinion without the shaft. Fig. 10 shows a clamp by means of which the jig mold is locked and handled. Figs. 11, 12, and 13 are respectively plan, side, and sectional views of a brass bushing as used for movement-plates. Fig. 14 shows the lower half of a mold for movement-plates. Fig. 15 is a longitudinal section of a mold for socket-wheels. Figs. 16 and 17 are face views of the two halves of a mold for balance-wheels; Figs. 18 and 19, the same for a mold for verges. Figs. 20, 21, and 22 are respectively side views of finished balance-wheel, verge, and socket-wheel. Fig. 23 is a plan view of a movement plate with brass bushings for bearings.

Similar letters represent corresponding parts throughout the different views.

A, Figs. 1, 3, and 4, is a cup-shaped piece into which fits the plug-shaped piece B, Figs. 2, 3, and 4. The office of the cup is to hold the brass wheel, Fig. 5, in place, and to that end is made of a size that the wheel may just enter. The plug of B fits well in the cup of A, to bring the axis of both parts of the mold in line when put together, and to press the wheel to the bottom. Through the middle of both halves of the mold is a hole, a part of which is slightly tapering, and forms the cavity for the shaft S. Sliding end pieces, $e$ and $e'$, held by set-screws $f$ and $f'$, extend into this hole to determine the length of the shaft, and also to hold the pivot-wires $d$ and $d'$ in place. The latter are placed in holes in the middle of the end pieces, $e$ and $e'$, to project into the shaft-cavity, say, one-half their length; or they may be made in one piece extending clear through. Adjacent to the place for the wheel the shaft-cavity is widened out to form the collet-cavity C. This cavity is to give a body of metal large and strong enough to hold the wheel and the pinion-wires. Within the collet-cavity and parallel to the shaft-cavity in the piece B are drilled the holes for the pinion-wires $p$ $p'$ $p^2$, &c., Figs. 2 and 4. The pinion-wires are placed in these holes to project into the collet-cavity about half their length. G is a conical hole through which the melted alloy is poured. On the outside of the mold are grooves $h$ and $h'$, fitting into V-shaped notches of a clamp, Fig. 10, by means of which the mold is pressed together and separated.

The wheel, Fig. 5, is of flat brass. Its central hole is notched, and when placed in position between the pieces A and B the edge of the hole projects into the collet-cavity. The notches are to keep the wheel from turning on the shaft.

The pivot and pinion wires may be slightly nicked where they project into the mold to prevent them from pulling out, although this is not always necessary, as the friction from the expanded alloy is sufficient to hold them in place.

The molds for the socket-wheel, Fig. 15, balance-wheel, Figs. 16 and 17, and verge, Figs. 18 and 19, are constructed on substantially the same principle as described above, differing only in the shape and position of the cavity, which latter is of the shape suited to the part to be cast.

In the socket-wheel mold, Fig. 15, $e^2$ is a sliding plug, which forms the core for the sleeve and determines its length.

In the balance-mold, $C^2$, Fig. 16, is the roller-table cavity, at the bottom of which is placed a thin roller-table of hard metal with a large notched central hole. (Not shown in drawings.) The hole $i$ holds the impulse-pin in position, so as to project into the collet or hub cavity.

In Fig. 17, $r$ is a half-round circular cavity to form the balance rim. $k$, $k'$, and $k^2$ are half-round grooves in which are placed the spokes. The latter project both into the rim and hub cavity. They are also half-round to fit the grooves. $l$, $l'$, and $l^2$ are openings to allow the metal to enter the rim-cavity. The portions formed by them are broken out after the wheel is cast. Fig. 17 shows the plug side $B^2$, and Fig. 16 is the cup-side $A^2$.

In the verge-mold, Fig. 18 is the cup side $A^3$, and Fig. 19 the plug side $B^3$, of the mold. $q$ and $q'$ are holes parallel to the shaft-cavity, into which fit the pallets. The latter are placed therein to project into the pallet-arm cavity. These pallets are previously formed of tempered steel and polished. The pallet-arm cavities $o$ and $o'$ extend out from the collet-cavity and register, respectively, with the holes $q$ $q'$.

$m$ and $n$ are respectively steady-pins and their holes, to bring the mold parts together in proper relative position.

Many ways to lock, hold, and handle such molds as I use are already well-known, and can be substituted to answer in this case. Fig. 10 shows a sliding clamp by means of which the above-described molds can be manipulated. U is a piece holding one side of the mold, sliding on a base which holds the other side. V is a set-screw to fasten the slide.

Fig. 14 is an iron block with a cavity of the same shape as the movement-plate. Where holes are desired, posts $z$ $z'$ $z^2$, &c., are erected to correspond with the size of hole desired, and flush with the top of the cavity.

On the posts for bearings are placed brass bushings, preferably with notches. Such a bushing for larger bearings is shown in Figs. 11, 12, and 13.

J, J', J², and J³ are movable pieces in the bottom of the mold to eject the cast-plate.

The top for this mold is not shown in the drawings. It consists simply of a flat piece with holes to fit on the screw-posts $j$ and $j'$, and another hole to pour in the metal. Methods for casting pillars, studs, and other portions on movement-plates are already well known, and can be readily applied in addition.

I prefer to use iron or steel for making molds.

To facilitate ejecting the finished parts, the internal sides of the molds are made slightly beveling.

The alloy used should contain antimony or bismuth, preferably both, to give it hardness and the quality of expanding on solidifying. Type metal, to which a little bismuth is added answers well. Most any alloy which has a comparatively low melting-point and possesses the property of expanding on solidifying will answer my purpose.

In venting and filling the mold with alloy any method known which is adapted to this class of casting, may be used. As it is advantageous to force the metal into the mold under pressure, I prefer to use a melting-pot with a force-pump, such as is used in casting type.

The finished wheels or shafts are ejected from the mold by pushing in the end pieces, $e$ and $e'$, which cuts off the gate at the same time.

In Fig. 6 is shown a finished wheel in which $s$, the shaft, and $c$, the collet, are of alloy. $p$ $p'$, &c., are the pinion-wires, of steel, partially embedded and clamped in the collet. $d$ and $d'$ are the pivots, of steel, similarly embedded in the shaft. W is the wheel, of brass, clamped and held by the collet.

Fig. 7 is a wheel-shaft and pinion formed as above described, having a shoulder, to which a wheel may be stalked in the ordinary manner.

A pinion which can be driven on a shaft is shown in Figs. 8 and 9. The pinion-wires $p$ $p'$ $p^2$, &c., are of steel and the body or collet $c$ is alloy.

A socket-wheel, as cast by the mold in Fig. 15, is shown in Fig. 20. The wheel W is of brass, partially embedded in the collet $c^3$. The latter, with the sleeve $y$, is one piece of alloy.

The balance-wheel in Fig. 21 is as cast by the mold shown in Figs. 16 and 17. The rim R is of alloy. The shaft $s$ and the collet or roller-table $c'$ are of one piece of alloy. The pivots and impulse-pin are held as before described. The acting part of the roller-table is a rather thin disk of steel at the bottom of the collet $c$. The roller-table plate has a small hole through which passes the impulse-pin. The rim and hub are connected by steel spokes.

The verge in Fig. 22 is cast by the molds shown in Figs. 18 and 19. The pallet-arms and shaft are one piece of alloy. The steel pivots are fastened as before described. The pallets are of polished tempered steel, partially embedded in enlargements of the pallet-arms. It is evident that the pallet-arms may be cast separate and then driven onto a turned-up shaft.

The movement-plate, Fig. 23, is of alloy. Brass bushings for bearings are embedded in the alloy in a manner as before shown. $x$, $x'$, $x^2$, and $x^3$ are holes for pillars. $z\ z'$, &c., are brass bearings embedded in the alloy.

I do not wish to confine my invention to the particular parts that I have described, nor to their particular forms, as these vary in kind and form according to the movement in which they are used.

From the description I have given any intelligent mechanic is enabled to adapt this invention to any changes in form or kind which he may require.

In this application I claim only the product of the method and the mechanisms above described, reserving the right to patents for the two latter divisions of the invention.

What I claim as my invention, and desire to secure by Letters Patent, is—

1. A cast shaft or arbor for clock-works, having its pivots, composed of hard metal, embedded, with their acting surfaces exposed, in the body of the shaft or arbor, which is composed of softer metal possessing a lower melting-point, substantially as and for the purpose set forth.

2. A cast shaft or arbor for clock-works, having its pinion-leaves, composed of hard metal, embedded, with their acting surfaces exposed, in the body of the shaft or arbor, which is composed of softer metal possessing a lower melting-point, substantially as and for the purpose set forth.

3. A cast shaft or arbor for clock-works, having a wheel of hard metal embedded, with its acting surfaces exposed, in the body of the shaft or arbor, which is composed of softer metal possessing a lower melting-point, substantially as and for the purpose set forth.

4. A cast part for clock-works, having such of its portions as come under frictional action composed of hard metal, embedded, with the acting surfaces exposed, in the body of the part, which is composed of softer metal possessing a lower melting-point, substantially as and for the purpose set forth.

In witness whereof I hereto affix my signature in the presence of two subscribing witnesses.

CHAS. STAHLBERG.

Witnesses:
 THOMAS RESTON,
 WILLIAM PATON.